2 Sheets—Sheet 1.

J. K. UNDERWOOD.

ROTARY GANG-PLOWS.

No. 7,865. Reissued Aug. 28, 1877.

Attest:

J. H. Coyne

A. J. McCullen

INVENTOR:

John K. Underwood

By F. F. Warner, his

Attorney.

THE NORRIS PETERS CO., PHOTO-LITHO., WASHINGTON, D. C.

2 Sheets—Sheet 2.

J. K. UNDERWOOD.

ROTARY GANG-PLOWS.

No. 7,865. Reissued Aug. 28, 1877.

Attest:
J. H. Coyne
O. J. MacAllister

INVENTOR:
John K. Underwood
By L. F. Warner, his
Attorney.

THE NORRIS PETERS CO., PHOTO-LITHO., WASHINGTON, D. C.

UNITED STATES PATENT OFFICE.

JOHN K. UNDERWOOD, OF ANOKA, MINNESOTA.

IMPROVEMENT IN ROTARY GANG-PLOWS.

Specification forming part of Letters Patent No. 169,499, dated November 2, 1875; Reissue No. 7,865, dated August 28, 1877; application filed July 24, 1877.

*To all whom it may concern:*

Be it known that I, JOHN K. UNDERWOOD, formerly of Sauk Center, in the county of Stearns and State of Minnesota, now of Anoka, in the county of Anoka, in said State, have invented a new, useful, and Improved Rotary Gang-Plow, of which the following is a specification, reference being had to the accompanying drawing, forming a part hereof, and in which—

Figure 1:
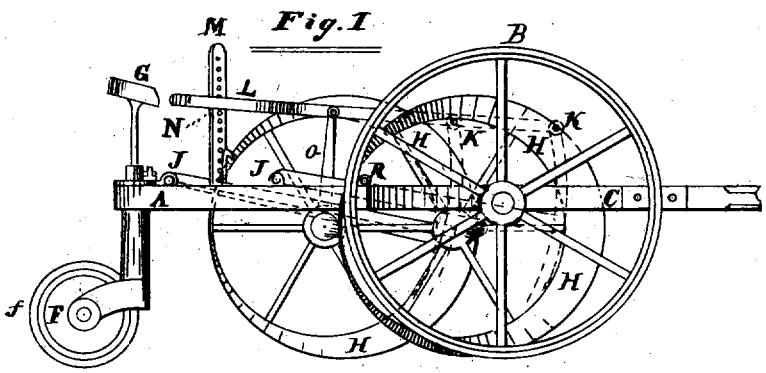
Figure 2:
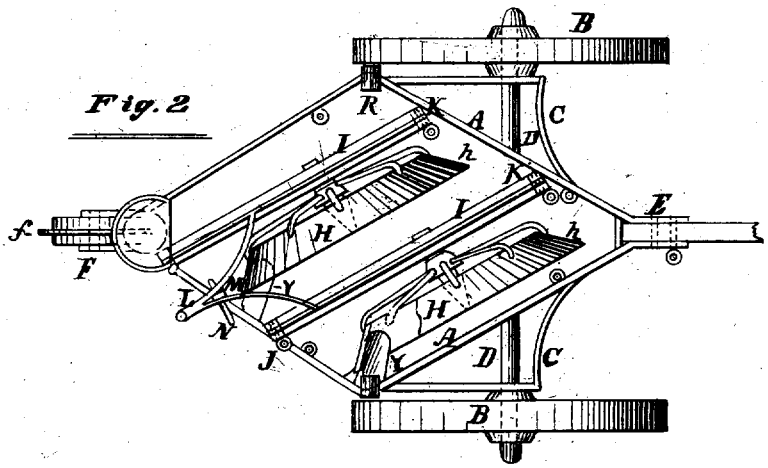
Figure 3:
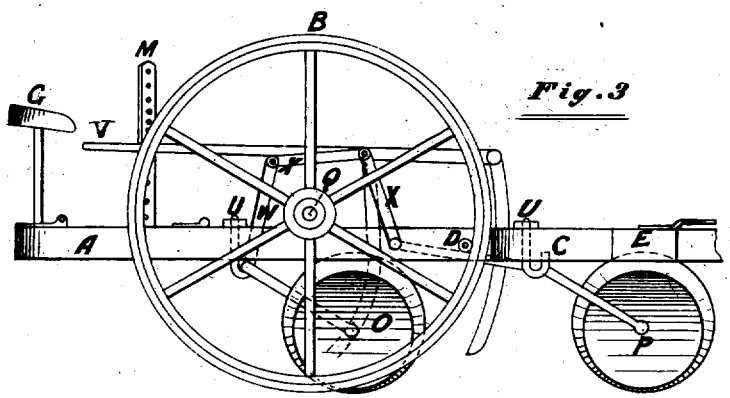

Figure 1 is a side view, in elevation, of my improved plow, and Fig. 2 is a plan view of the same. Fig. 3 is a side elevation of a modification thereof, and Fig. 4 is a plan view of said modification.

I will now proceed to describe my invention, as illustrated in said Figs. 1 and 2.

A is the main frame, mounted on truck-wheels B B. C is an auxiliary frame or brace, and D is the axle of the truck-wheels. E is the draft-tongue, and F is a caster-wheel at the rear end of the machine, and arranged underneath the seat G. H H represent two dish-shaped rotary wheel-plows, mounted on the beams I I, and revolving in a vertical plane inclining to the land-side at an angle of about thirty-five to forty degrees to the line of draft. The rims *h* of these wheel-plows flare from the land-side at an angle of about forty-five degrees to their axes, as shown in the drawings, forming a cutting-edge at the periphery.

Figure 4:
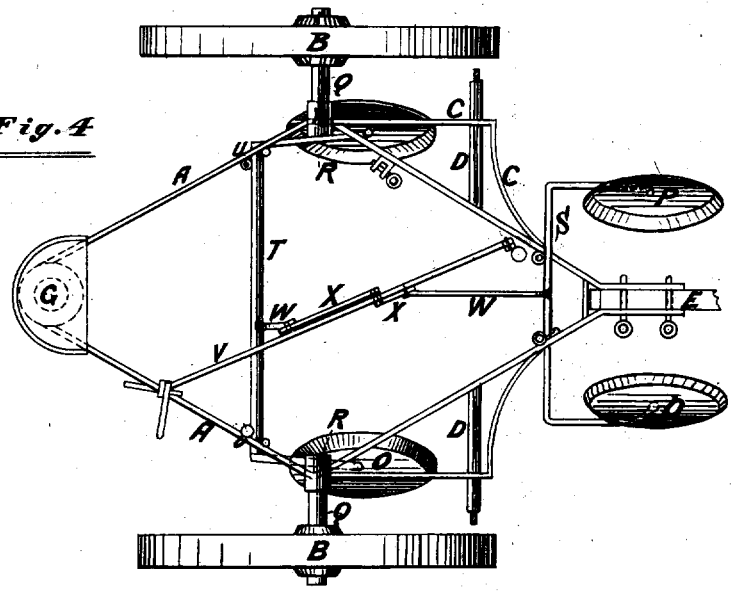

I prefer, when these wheels are large, to make them with radial spokes and open centers, as shown in Fig. 2; but they may be made solid, in dish form, as shown in Figs. 3 and 4.

The beams I I are pivoted at their rear ends to the frame A at J J, and their front ends are inserted in segmental grooved keepers or guides K K, so that they can slide up and down in the grooves. The beams I I may be adjusted and held in place by means of a forked lever, L, having its fulcra on bars *o*, standard M, and pin N, which are so arranged with relation to the seat that the driver, while sitting therein, may make any needed adjustment of the plows to run either deep or shallow, or may raise them from the ground entirely by raising or depressing the front ends of the beams I I by means of said lever, which may be pivoted to any fixed part of the machine, and connected to the said beams in any convenient way for raising and depressing.

Plows of this construction will turn wider furrows with a given force exerted than those of other forms, and the width may be varied by inclining the caster-wheel F to the right or left, for which movement it is adapted, and it has a fastening device for holding it in any position in which it may be set. It also has a circular flange, *f*, projecting from its periphery, which cuts into the ground, and prevents lateral movement. Y Y are scrapers, attached to the main frame, and arranged to remove any soil from the concavities of the wheel-plows.

Figs. 3 and 4 represent my machine modified for use as a cultivator. In this modification I attach to the main frame four cultivator-wheels, O O P P, which are smaller than the wheels H H, but similar thereto in construction, except that they have no central openings, the space within the flaring rims occupied by the spokes in wheels H H being filled by a plain smooth plate, as shown in the drawings. When the cultivator-plows O P are applied, the large wheels H H and the caster-wheel F are removed, and the truck-wheels B B are set back upon their axles Q Q, which latter are detachably connected to the frame A at the corners R R. The forward cultivator-wheels are mounted upon the front cranked axle S, and the others on the rear cranked axle T, and are arranged to run in different lines, and the wheels in each pair diverge from each other from the ground upward, as shown in the drawings. Said cranked axles are detachably connected to the frame A by means of hook-headed bolts U U, and to the lever V, Fig. 3, by the arm W and rod X, so that they may be set and held to run either high or low, as may be desired. Y Y are scrapers for clearing the wheel-plows as they revolve.

It will be perceived from the foregoing description, and from reference to the drawings, that the cutting or plowing parts of the plowing-wheels H O P consist of a flaring rim, having a perfectly smooth face or surface presented to the land-side. The rims should be made of steel or other hard metal. It will also be perceived that the machine is not supported upon the plowing-wheels, but on the draft or truck wheels B B, and that the plowing-wheels are vertically adjustable with relation to the truck or carriage.

I am aware that rotary flaring disks have heretofore been used for plowing, and I do not, therefore, claim such, broadly; but

Having thus described my invention, what I claim as new, and desire to secure by Letters Patent, is—

1. In a rotary plowing-machine, carried on truck-wheels, the rotary plowing-wheels H H, with flaring rims, having sharp, smooth, and perfectly circular peripheries, mounted on truck-wheels, and working in planes diagonal to the line of draft, substantially as described.

2. The rotary plowing-wheels O O P P, arranged in pairs upon a frame mounted upon truck-wheels B B, and the wheels in each pair diverging from each other from the ground upward, substantially as shown and described.

3. The combination of the frame A, truck-wheels B B, hook-bolts U, lever V, standard M, and wheels O O P P, combined and arranged to operate substantially as described.

4. The combination of the rotary plowing-wheels H, pivoted beams I, keepers K, lever L, and standard M, all mounted on truck-wheels B B, and combined and arranged to operate substantially as described.

5. In combination with the truck-wheels B B, frame A, and plowing-wheels H H, set diagonally to the line of draft, I claim the caster-wheel F, with its flange *f*, all arranged to operate substantially as described.

6. The combination of the frame A C, having two sets of axles, D Q, hook-bolts U, standard M, and keepers K, adapted to receive rotary plows or cultivators, in the manner described.

7. The combination, with rotary plows H, of beams I, pivoted upon the frame at J, and swinging in keepers K, the forked lever L, bars *o*, standard M, and pin N, as and for the purpose specified.

JOHN K. UNDERWOOD.

In presence of—
GEO. W. MORRILL,
J. C. FROST.